(12) United States Patent
Alger, II et al.

(10) Patent No.: US 10,781,786 B2
(45) Date of Patent: *Sep. 22, 2020

(54) MICROWAVE ENHANCED COMBUSTION WITH FEEDBACK FREQUENCY CONTROL FOR DYNAMIC IMPEDANCE MATCHING

(71) Applicant: Southwest Research Institute, San Antonio, TX (US)

(72) Inventors: Terrence F. Alger, II, San Antonio, TX (US); Yilun Luo, Ann Arbor, MI (US); Scott R. Hotz, Pinckney, MI (US); Ronnie E. Randolph, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,919

(22) Filed: Oct. 23, 2018

(65) Prior Publication Data

US 2020/0124018 A1 Apr. 23, 2020

(51) Int. Cl.
| | |
|---|---|
| *F02P 1/00* | (2006.01) |
| *F02P 23/04* | (2006.01) |
| *F02P 9/00* | (2006.01) |
| *F23C 99/00* | (2006.01) |
| *F23C 7/00* | (2006.01) |
| *F02B 3/06* | (2006.01) |

(52) U.S. Cl.
CPC .............. *F02P 23/045* (2013.01); *F02B 3/06* (2013.01); *F02P 9/002* (2013.01); *F23C 7/004* (2013.01); *F23C 99/001* (2013.01)

(58) Field of Classification Search
CPC ...... F02D 35/023; F02D 35/025; F02B 51/06; F02P 23/045; H01P 5/18; H05B 6/80; H05B 6/802
USPC .................................................. 123/594, 609
See application file for complete search history.

(56) References Cited

U.S. PATENT DOCUMENTS

| | | | | |
|---|---|---|---|---|
| 4,297,983 | A * | 11/1981 | Ward | F02P 23/04 |
| | | | | 123/536 |
| 10,465,618 | B1 * | 11/2019 | Luo | F02D 35/023 |
| 2015/0168322 | A1 * | 6/2015 | Alocilja | G01N 24/08 |
| | | | | 435/7.1 |

* cited by examiner

*Primary Examiner* — John Kwon
(74) *Attorney, Agent, or Firm* — Livingston Law Firm

(57) ABSTRACT

A system and method for generating microwaves for microwave enhanced combustion (MEC) input to an MEC antenna of an internal combustion engine. The system uses a directional coupler to deliver the MEC input signal to the MEC antenna and to receive a reflected power signal from the MEC antenna. A feedback path determines a desired frequency, based on the reflected power and using an impedance-matching controller that matches the reflected power to a desired frequency value. Additional inputs, such as various engine conditions, can also be used to determine the desired frequency.

15 Claims, 2 Drawing Sheets

MICROWAVE ENHANCED COMBUSTION WITH FEEDBACK FREQUENCY CONTROL FOR DYNAMIC IMPEDANCE MATCHING

TECHNICAL FIELD OF THE INVENTION

This invention relates to internal combustion engines, and more particularly to microwave enhanced combustion.

BACKGROUND OF THE INVENTION

Recent research has shown a beneficial effect of microwave energy on the combustion processes of air-fuel mixtures. Microwave enhanced combustion (MEC) boosts combustion kinetics by accelerating flame electrons and creating radicals using microwave energy. MEC has demonstrated promising results in improving thermal efficiency and emissions for different engine platforms by improving flame speed, dilution tolerance, and combustion stability.

The MEC concept requires the combustion chamber to couple with the microwave energy field, leading to efficient energy transfer between the microwaves and the flame front as it travels across the chamber. This coupling is only achieved when the impedance of the microwave system matches the impedance of the combustion chamber.

As conventionally embodied, MEC transmits microwaves to the flame only during the early combustion phase. After the first 3% to 5% of the combustion duration, around 90% of microwave energy is reflected to the transmitter before being emitted to flame. This large reflection limits MEC's ability to enhance combustion and causes device heating and potential damage.

The MEC reflection is caused by a radio frequency phenomenon known as impedance mismatch. To mitigate reflection, the impedance of the microwave transmitter should be matched to the impedance of the flame, which changes during combustion. In an internal combustion engine, an additional source of impedance variation comes from the changing volume of the combustion chamber due to the motion of the piston. Both sources of impedance variation can lead to an impedance mismatch.

Conventional MEC impedance matching devices are based on tuning screws or waveguide stubs, which are typically adjusted only before engine ignition. In addition, because the timing of the ignition event can change every engine cycle, and the optimal impedance match using conventional equipment can only occur at one fixed timing, it is difficult to ensure that an impedance mismatch will not occur in a running engine.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a control method to improve microwave enhanced combustion (MEC) by maximizing microwave transmission efficiency for the evolving flame based on the electrical impedance within the combustion chamber. The method is based on the recognition that after ignition, as the in-cylinder air-fuel mixture transforms to flame, its impedance changes dramatically from insulative to dielectric/conductive. Thus, the method matches the impedance of the MEC transmitter and the impedance within the cylinder, using real-time feedback frequency control.

As stated in the Background, conventional MEC impedance matching is performed before combustion, and does not change impedance during combustion. In other words, conventional MEC mechanically sets an impedance matching device for one combustion condition, which remains static throughout engine operation. Furthermore, even if dynamic impedance matching were attempted, the mechanical devices that are used are not fast enough to match the changing impedance within the cylinder. The inability of current MEC processes to match impedance during combustion significantly limits the microwave energy transmitted to combustion.

An MEC impedance matching process should account for at least three factors. A first factor is changes in impedance with different environmental conditions, such as altitude, fuel type, or temperature. A second factor is changes in impedance with different engine operating conditions, such as varying engine speed and load as set by the driver and variations in ignition timing and in-cylinder density that accompany those speed and load changes. A third factor is changes in impedance within the split-second period of combustion.

Feedback Path for Frequency Control of MEC Signal

Figure 1:
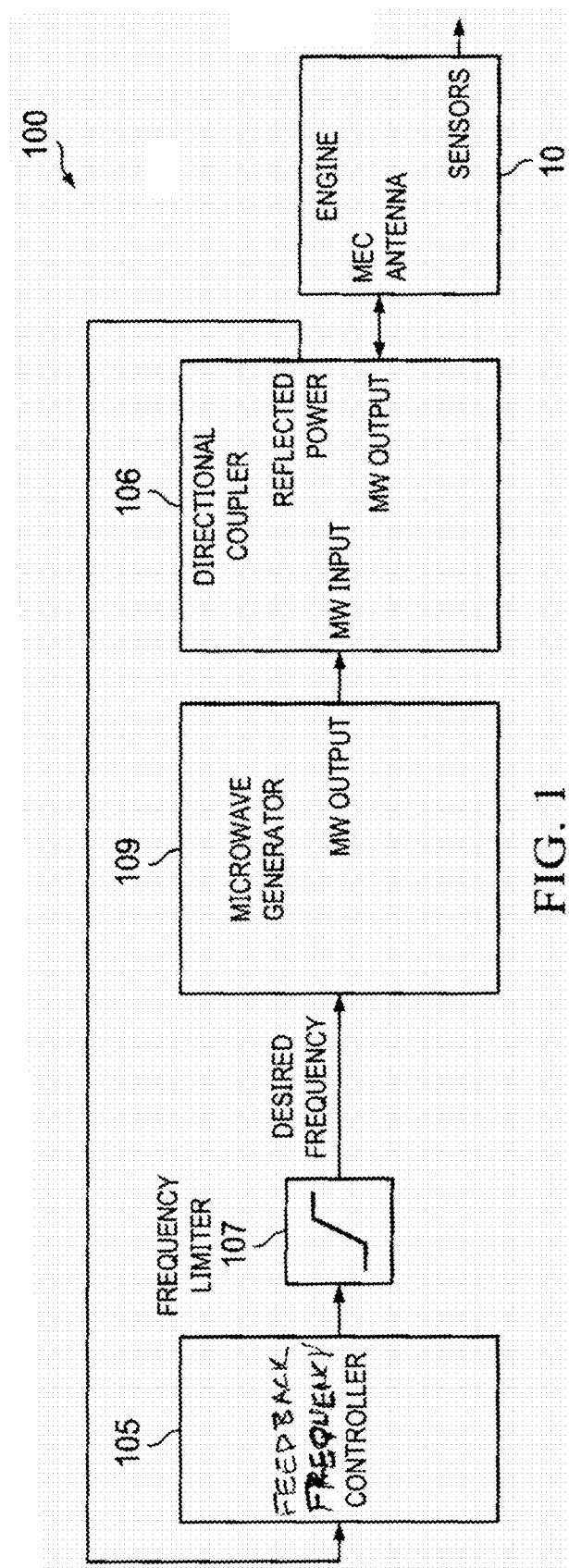
FIG. 1 illustrates an MEC antenna system, with feedback control for frequency of the MEC signal.

FIG. 1 illustrates a microwave enhanced combustion (MEC) system 100 with real-time feedback control to determine the frequency of the MEC signal. System 100 is assumed to have appropriate hardware and programming for the tasks described herein. It may be implemented within an engine control unit or as a separate device.

Engine 10 is an internal combustion engine, and is assumed to have an MEC antenna, fuel injectors or other fuel delivery equipment, and sensors for detecting various engine conditions. These conditions include at least engine position, and may also include in-cylinder pressure and temperature. Sensors for other engine conditions such as airpath sensors and actuator position sensors may also be used, with their data contributing to engine condition data as described herein.

Engine 10 may be any internal combustion engine, including gasoline, natural gas, dual fuel and diesel engines, burners and jet engines. It is assumed that engine 10 has at least one combustion chamber, whose combustion conditions are referred to herein as "in-cylinder" conditions.

MEC system 100 is based on a feedback path to control the frequency of the MEC signal, using an impedance matching controller 105. A directional coupler 106 receives reflected power from the MEC antenna, which is delivered to the controller 15. As explained below, controller 105 operates such that changes in the reflected power result in changes to the desired frequency requested from a microwave generator 109, to minimize the reflected power.

The method described herein is performed on a continuous basis during operation of the engine 10. The "current" values described below represent data acquired in real time while engine operating conditions may or may not change.

More specifically, the feedback control path begins with non-linear controller 105, which receives a value representing the current reflected power, via directional coupler 106.

Controller 105 uses this reflected power value to estimate a current value of the impedance within the combustion chamber, referred to herein as "in-cylinder impedance". As explained above, this current impedance value can be a combination of various factors. The combustion component represents a combination of contributions from flame and burnt and unburnt gas. Controller 105 then matches this estimated impedance to a feedback frequency term.

The calculation of in-cylinder impedance and the matching of this impedance to frequency may be performed with various algorithms, models, or mappings designed to select a frequency that will minimize impedance. For example, a microwave model of the MEC antenna, combustion chamber, and flame could be constructed and used to calculate in-cylinder impedance at a given point in time, which is then matched to a reflection-reducing frequency. Controller 105 may be implemented with a proportional-integral-derivative (PID) controller, or a fuzzy controller. A fully implemented controller 105 may directly match each current reflected power value to a feedback frequency value.

The output of the controller 105 is delivered to a frequency limiter 107. This limits the output of controller 105 to a frequency that is within the range of microwave generator 109. The result is the "desired frequency" for the MEC signal.

The desired frequency is delivered to variable frequency microwave generator 109. Microwave generator 109 generates microwaves in forms of continuous wave (CW) or pulses with its output frequency determined by controller 105. Generator 109 provides the microwave output to the MEC antenna of engine 10 via directional coupler 106.

Additional Feedforward Path for Frequency Control

Figure 2:
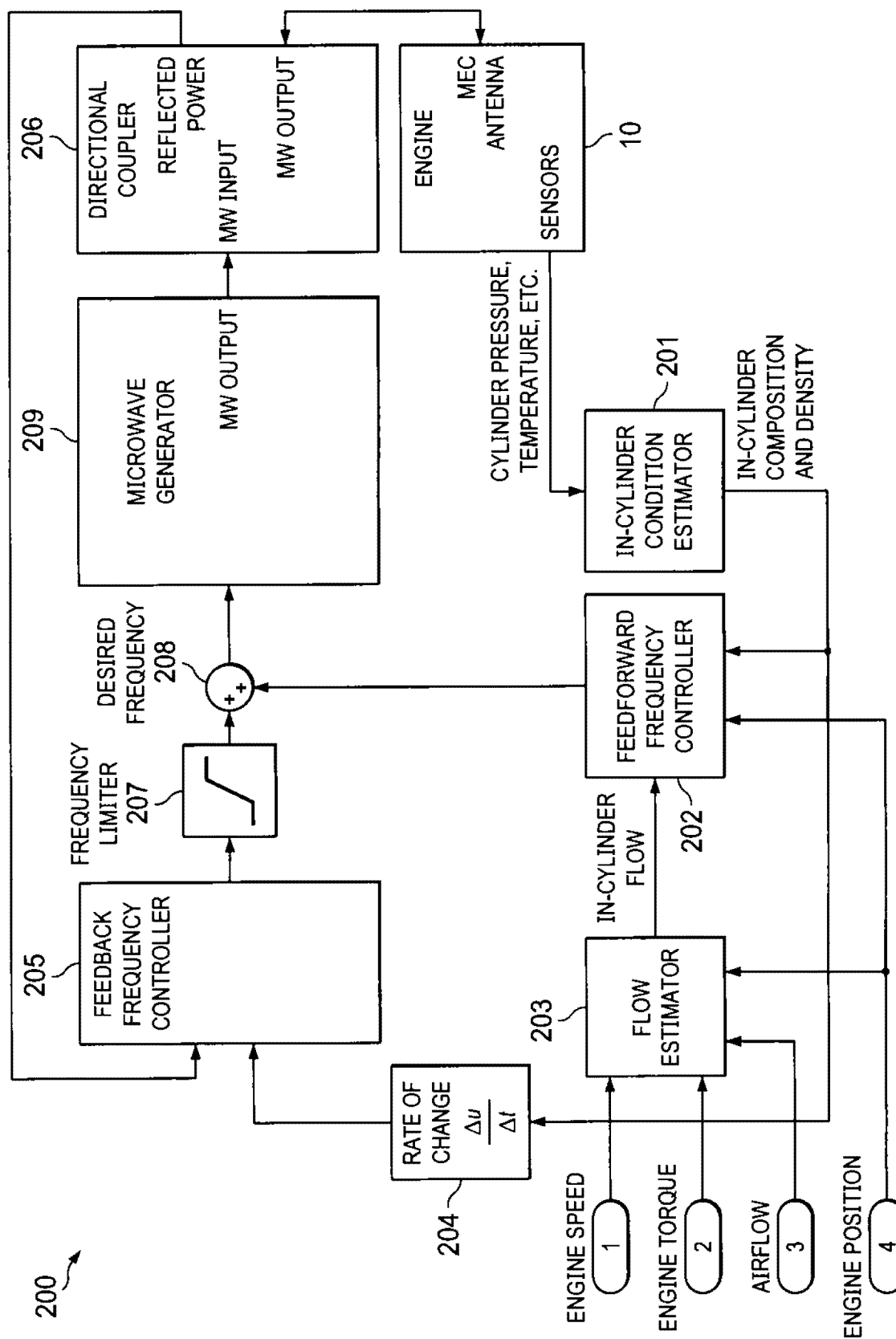
FIG. 2 illustrates the system of FIG. 1, with an additional feedforward path for contributing to the calculation of the desired frequency.

FIG. 2 illustrates an MEC system 200, which has the feedback path of FIG. 1, and also a feedforward path that accounts for in-cylinder conditions in the determination of the desired frequency.

MEC system 200 uses various sensor input representing engine conditions. To this end, an in-cylinder condition estimator 201 receives input such as cylinder pressure and cylinder temperature from appropriate sensors installed in engine 10. Current fueling mass input is received from the engine's fueling controller. The output of estimator 201 is data representing in-cylinder composition and density.

The in-cylinder composition and density data is delivered to a feedforward frequency predictor 202. Predictor 202 also receives engine position data from an engine position sensor and in-cylinder flow data from a flow estimator 203.

Flow estimator 203 estimates in-cylinder flow from engine speed, engine torque, air flow, and engine position. Air flow data may be derived from various airpath sensors and actuator positions.

Feedforward frequency predictor 202 uses various in-cylinder conditions to add input from a feedforward path to the feedback path of FIG. 1. It is expected that the minimum input to predictor 202 would be engine position. However, additional inputs, such as in-cylinder flow, composition, and density will enhance the response time, robustness, and other control advantages of system 200.

Feedforward frequency predictor 202 delivers a feedforward frequency value to the feedback frequency control path. This feedforward frequency term predicts a microwave frequency close to the optimum based on the current engine conditions. As stated above, these engine conditions may include some or all of the following: engine speed, combustion chamber volume, and in-cylinder composition, density, temperature, and flow.

In addition to the feedforward frequency path, system 100 has a frequency feedback path, similar to that described above in connection with FIG. 1. This feedback path begins with a rate of change calculator 204, which uses the in-cylinder composition and density data from estimator 201 to calculate a rate of change.

The in-cylinder composition and density rate of change is delivered to non-linear controller 205, which also receives a value representing the reflected power from a directional coupler 206. Controller uses these values to estimate an in-cylinder impedance.

Once in-cylinder impedance is estimated, controller 205 matches this impedance to a feedback correction frequency value. Like controller 105, controller 205 may be implemented with a proportional-integral-derivative (PID) controller, or a fuzzy controller.

The output of the controller 205 is delivered to a frequency limiter 207. A frequency combiner 208 adds the feedforward frequency term to the feedback correction frequency value to obtain a desired MEC frequency.

The desired MEC frequency is delivered to a variable frequency microwave generator 209. Generator 209 generates microwaves in forms of continuous wave (CW) or pulses with its output frequency determined as described herein. Generator 209 provides the microwave output to the MEC antenna of engine 10 via directional coupler 206.

What is claimed is:

1. A system for generating microwaves for microwave enhanced combustion (MEC) input to an MEC antenna of an internal combustion engine, comprising:
   a microwave generator configured to generate an MEC input signal at different frequencies;
   a directional coupler for delivering the MEC input signal to the MEC antenna and for receiving a reflected power signal from the MEC antenna;
   a feedback path for determining desired frequency values, the feedback path comprising an impedance-matching controller;
   wherein the impedance-matching controller is configured to receive the reflected power signal and to match current reflected power values to a desired frequency value.

2. The system of claim 1, wherein the impedance-matching controller is implemented with a proportional-integral-derivative controller.

3. The system of claim 1, wherein the MEC input signal is a continuous wave signal.

4. The system of claim 1, wherein the MEC input signal is a pulsed signal.

5. A system for generating microwaves for microwave enhanced combustion (MEC) input to an MEC antenna of an internal combustion engine, comprising:
   a microwave generator configured to generate an MEC input signal at different frequencies;
   a directional coupler for delivering the MEC input signal to the MEC antenna and for receiving a reflected power signal from the MEC antenna;
   a feedback path for determining frequency values, the feedback path comprising an impedance-matching controller;
   wherein the impedance-matching controller is configured to receive the reflected power signal and to match current reflected power values to a frequency correction value;
   a feedforward path for determining a feedforward frequency value;

wherein the feedforward path comprises at least a frequency predictor that receives engine condition data and matches current engine condition values to a current feedforward frequency value;

wherein the engine condition data comprises one of more of the following data: engine position or in-cylinder flow; and a desired frequency combiner for adding the frequency correction value to the feedforward frequency value to obtain the desired frequency.

6. The system of claim 5, wherein in-cylinder flow is estimated from a combination of data, comprising one or more of the following data: engine speed, engine torque, airflow actuator data, or engine position data.

7. The system of claim 5, further comprising an in-cylinder condition estimator that receives in-cylinder data comprising at least pressure and temperature, and estimates in-cylinder composition and density, and wherein the engine condition data further comprises in-cylinder composition and density data.

8. The system of claim 6, further comprising a rate of change calculator that calculates the rate of change of in-cylinder composition and density for delivery to the impedance-matching controller for use in determining the feedback frequency value.

9. The system of claim 5, wherein the impedance-matching controller is implemented with a proportional-integral-derivative controller.

10. The system of claim 5, wherein the MEC input signal is a continuous wave signal.

11. The system of claim 5, wherein the MEC input signal is a pulsed signal.

12. A method of generating microwaves for microwave enhanced combustion (MEC) input to an MEC antenna of an internal combustion engine, comprising:

using a directional coupler to deliver an MEC input signal to the MEC antenna and to receive a reflected signal from the MEC antenna;

delivering the reflected signal to an impedance-matching controller configured to match reflected power values to feedback frequency values;

delivering a feedback frequency values as desired frequency values to a microwave generator; and using the microwave generator to generate the MEC input signal at each desired frequency value.

13. The method of claim 12, further comprising matching engine condition data to feedforward frequency values and adding the feedforward frequency values to the feedback frequency values to determine the desired frequency values; wherein the engine condition data comprises one or more of the following data: engine position or in-cylinder flow.

14. The method of claim 12, wherein the engine condition data further comprises in-cylinder composition and density.

15. The method of claim 12, further comprising estimating in-cylinder composition and density, calculating a rate of change of in-cylinder composition and density and delivering the rate of change to the impedance-matching controller for use in determining the feedback frequency value.

\* \* \* \* \*